United States Patent [19]

Iten et al.

[11] 4,206,853
[45] Jun. 10, 1980

[54] COOKING UTENSIL

[75] Inventors: Kurt Iten, Steinhausen; Franz Hochuli, Zug, both of Switzerland

[73] Assignee: Verzinkerei Zug AG, Zug, Switzerland

[21] Appl. No.: 925,845

[22] Filed: Jul. 18, 1978

[30] Foreign Application Priority Data

Jul. 18, 1977 [CH] Switzerland ............ 8842/77

[51] Int. Cl.² ............................................. A47B 95/02
[52] U.S. Cl. ............................... 220/94 R; 16/114 A
[58] Field of Search ............ 220/94 R, 96; 16/114 R, 16/114 A

[56] References Cited

U.S. PATENT DOCUMENTS

| 1,237,935 | 8/1917 | May | 16/114 A |
|---|---|---|---|
| 1,268,089 | 6/1918 | Borsse | 16/114A |
| 1,364,552 | 1/1921 | Hill, Jr. | 16/114 A |
| 2,368,297 | 1/1945 | Hanke | 220/94 R |
| 2,712,151 | 7/1955 | Becht | 16/114 A |
| 3,272,547 | 9/1966 | Pryce | 16/114 A |
| 3,798,706 | 3/1974 | Wolfson et al. | 16/114 A |

FOREIGN PATENT DOCUMENTS

| 2510894 | 9/1976 | Fed. Rep. of Germany | 16/114 A |
|---|---|---|---|
| 1511924 | 2/1968 | France | 220/94 R |
| 1025861 | 4/1966 | United Kingdom | 220/94 R |

*Primary Examiner*—Joseph Man-Fu Moy
*Attorney, Agent, or Firm*—Robert K. Youtie

[57] ABSTRACT

The invention involves a household utensil or vessel, particularly for food preparation, consisting of a receptacle with a flanged rim extending over at least part of the circumference and angled outward and of a haft-like handle detachably affixed on the flanged rim for removal therefrom.

5 Claims, 4 Drawing Figures

COOKING UTENSIL

BACKGROUND OF THE INVENTION

Various types of household cooking utensils with detachable handles are known which, in use, possess various advantages, for example in the case of a nested series of different size receptacles which can be used with the required interchangeably attachable handle, only one handle need be present. Further, receptacles without a handle are much easier to place in a kitchen cabinet or refrigerator and, without the handle, receptacles are also very suitable for use in the baking-oven and can also be cleaned without the handle in the dishwashing machine, since, as a rule, the material used for the handle does not tolerate extreme heat. Finally, such an utensil, of an attractive shape, can be used, even without the handle, as a serving-dish and, finally, can contribute to the prevention of accidents, because the handle can be detached when cooking on the stove, in order to prevent children from carelessly pulling the utensil down from the stove.

The known types of household cooking utensils of this kind generally have, however, parts for the attachment of the handle which project laterally from the wall of the receptacle, where dirt accumulating in hard-to-reach corners can be removed only with difficulty, which, because of these troublesome attachment parts and also from the aesthetic standpoint, renders such an utensil not too satisfactory for use as a serving-dish.

In the case of one of the known types of such a household cooking utensil, only one hole for connection with the handle is present on the flanged rim. With this utensil, fully satisfactory in terms of aesthetic appearance, ease of cleaning, etc., the handle cannot, however, be detached and re-affixed with one hand, which, in manipulation on the stove, would be highly advantageous, as the handle has a bolt device to be stuck through the hole in the flanged rim, which must be turned with one hand, while the other hand holds onto the handle. When the utensil is used over an open flame, the bolt-device, consisting of non-heat-resistant material, is exposed to the heat. Moreover, because of possible material-strength tolerances in the flanged rim, the firm hold of the handle is not always ensured.

SUMMARY OF THE INVENTION

The task underlying the invention consisted in creating a household utensil of the type described above, without the aforementioned disadvantages. In the case of the household utensil, the handle should be easily detached and affixed with one hand and thereby a secure connection without play should be produced between the handle and the receptacle. In order to achieve this, the initially mentioned type of household utensil according to the invention is characterized by the fact that there are provided on the flanged rim and on the handle appropriately shaped interfitting centering or locating means and, also, a stop or limiting device is provided on the handle. The locating or centering means coacts with the stop or limiting means and are adjacent to each other. The locating and limiting means are on one side of the flanged receptacle rim and there is further provided a clamping element on the other side of the flanged rim movable in a radial direction with reference to the receptacle and which can be moved back and forth between two positions and is carried in the handle. In one position, the clamping element tightly clamps the flanged rim between itself and the opposing surface or jaw of the handle and, in the other position, the clamping element or movable jaw can be moved into the handle for removal of the handle.

In the case of the preferred arrangement, the locating or centering means consist, on the flanged rim and on the handle, of a hole punched through the flanged rim and of a peg-shaped locking attachment passing into the hole from the fixed surface of the handle facing the flanged rim. In a variant arrangement, the centering or locating means may also consist of a depression or elevation and of an elevation or depression formed complementarily to this depression or elevation on the opposing surface of the handle facing the flanged rim.

In the case of the preferred arrangement, the stopping or limiting devices consist appropriately of a stopping edge extending at right angles to the diameter of the receptacle and limiting the flanged rim rectilinearly and of a stopping or limiting handle surface formed to fit closely against the stopping edge, located on the handle between the centering means and the clamping element. The clamping element is appropriately a U-shaped metallic body, both side-pieces of which fit, in the tightly clamped position, with their longitudinal edges against the flanged rim and are carried in the handle for moving the clamping element back and forth, and the cross-piece of which is rigidly joined to an activating key movable back and forth on the outside of the handle. In the case of the preferred arrangement of the household utensil, the flanged rim and the plane of motion of the clamping element form an angle and the clamping element is wedge-shaped, and, in the tightly clamped position, is pressed against the flanged rim by wedge effect by the pressure of a spring arranged in the handle.

The special advantages of this household utensil consist in the fact that the handle can be grasped with one hand and, with the thumb of the same hand, the activating key can be pushed back against the pressure of the spring, so as to make it possible for the handle to be disconnected from the receptacle with one hand, to which receptacle the handle can also be attached with one hand. Another advantage is the secure affixing of the handle, as the wedge-shaped clamping element, under spring-pressure, automatically adjusts for differences in material thicknesses of the flanged rim. Moreover, the clamping element, preferably consisting of metal, protects the non-metallic parts of the handle situated over it from the heat of an open flame.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figures 3, 4:
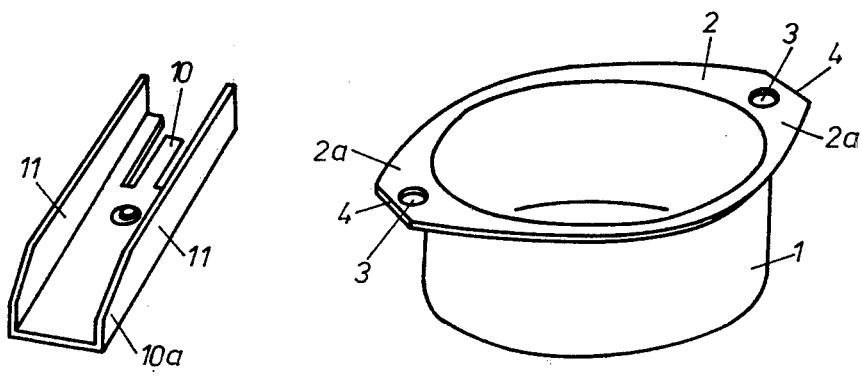
FIG. 3 is a perspective view of the receptacle showing the flanged rim in diagrammatic representation.
FIG. 4 is a perspective view of the clamping element apart from the handle.

The household utensil comprises the receptacle 1 represented in FIG. 3, a cooking-pot, for example, with an upper flanged rim 2, which is formed wider at the opposite sides that at the remainder of the circumference and, in each of the wider areas there is one hole 3. A generally flat region 2a of the flanged rim 2 surrounds at least each hole 3 and forms a handle attachment area. The flanged rim 2 further possesses at the outer extremity of each enlarged region 2a an outwardly facing limiting or stopping edge 4, extending at right angles to the diameter of the receptacle 1. The stop or limiting edge 3 is generally straight and defines the outer limit of the flanged rim 2 outward of the hole 3.

Figure 1:
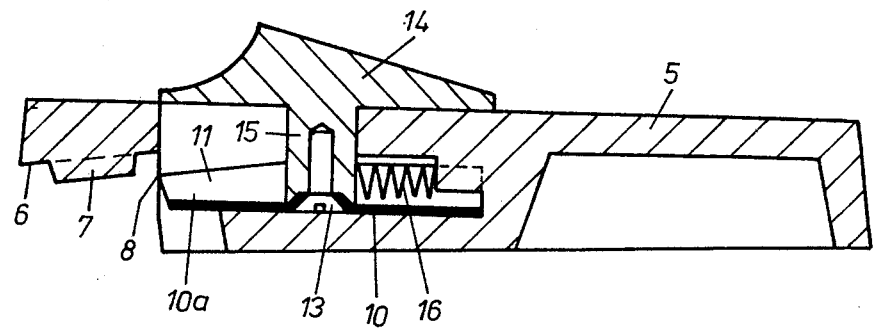
FIG. 1 is a longitudinal section through the handle with clamping element retracted.
Figure 2:
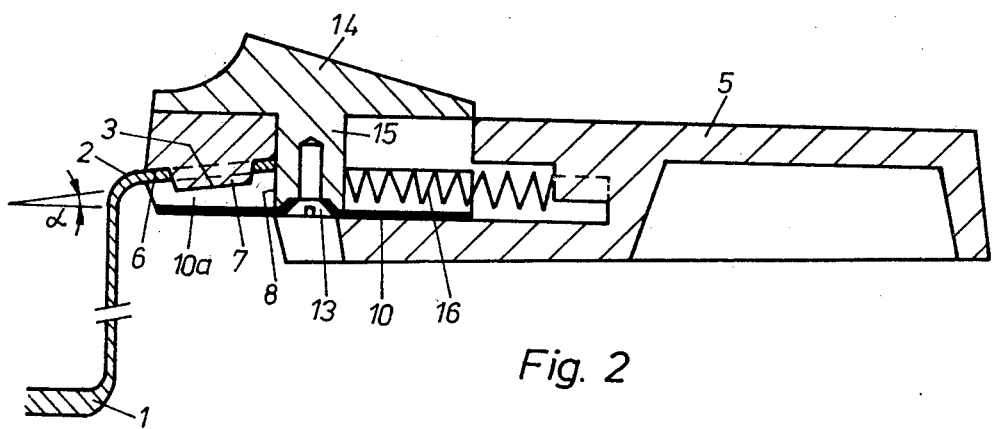
FIG. 2 is a longitudinal section through the handle attached to the flanged rim of a receptacle.

The handle 5, represented on a larger scale and in longitudinal section in FIGS. 1 and 2, possesses at the anterior (left in the drawing) a jaw face or end apposing surface 6, which is brought to bear against complementary apposing surface or enlarged region 2a of the flanged rim when the handle is attached to the flanged rim, as can be seen from FIG. 2. The receptacle 1 is represented in vertical section. A peg-shaped attachment, boss or projection extends downwardly from the apposing surface or jaw face 6 and catches or enters into the hole 3 on the flanged rim to constitute locating or centering means for the connection of the handle and flanged rim.

The handle 5 also includes, inwardly from the anterior end and the attachment or boss 7, an essentially vertically disposed stopping surface or limiting abutment 8. When the handle 5 with this stopping surface 8 is brought to bear against the stopping edge 4 of the flanged rim 2, the attachment 7 of the handle can also be introduced into interfitting relation with the hole 3 of the flanged rim. As can be seen from FIG. 2, the projection of the attachment 7 is somewhat greater than the material gage or thickness of the flanged rim 2, so that the attachment 7 projects somewhat downwardly through and beyond the region 2a.

In the lower part of the handle 5, a clamping element or shiftable jaw 10 is arranged to shift in a radial direction, back and forth with reference to the receptacle 1. The clamping element 10 represented in perspective in FIG. 4 is a U-shaped metallic body, both of whose side-pieces 11 are carried in the handle 5, the side-pieces 11 having their edges in clamping engagement with the underside of the rim region in the tightly clamped position according to FIG. 2. In this position with the handle 5 attached on the flanged rim 2, the side walls or pieces 11 fit with their longitudinal edges on opposite sides of the attachment 7 and against the lower side of the flanged rim 2. The cross-piece or web 12 of the clamping element 10 is attached by means of a screw 13 to a peg or pin 15 extending downwardly from an activating key or slide button 14 into the handle and between side walls 11. The activating key 14 is movable back and forth on the upper side of the handle and is urged forwardly by the action of a spring 16 arranged in the handle and pressing forwardly against the peg 15 as seen in FIG. 2.

The flanged rim 2 and the plane of motion of the clamping element 10 form an angle α. Further, the segment 10a of the clamping element 10, beneath and against the flanged rim in the clamping position, is wedge-shaped, including the angle α for conforming engagement with the rim. That is, both side-pieces of the clamping element 10 are bevelled at the anterior end corresponding to the aforementioned angle α. This causes the clamping element 10 to be pushed as a wedge under the flanged rim 2, whereby differences in the material thickness of this flanged rim are automatically compensated and a firm connection of the handle to the flanged rim is achieved.

For the detachment of the handle with one hand, the activating key 14 need only be pushed back with the thumb against the pressure of the spring 16, whereupon the handle can be moved upwardly and away for the purpose of withdrawing the attachment 7 from the hole 3 in the flanged rim. The fixing of the handle on the flanged rim can be effected in a corresponding and reversed manner. With the handle affixed on the flanged rim, the clamping element 10, being made out of metal, protects the parts of the handle not made of metal from the heat of an open flame.

Thus, it will now be appreciated that the handle or handgrip body 5 is generally of elongate configuration having one end region, the rightward end region in FIGS. 1 and 2 provided for manual grasping. Projecting longitudinally outwardly from the opposite or connection end (the left-hand end as seen in the drawings), is the fixed gripping member or jaw 6 having its under surface or gripping face disposed generally obliquely and facing downwardly and provided thereon with the depending projection or formation 7. The jaw 6 may extend longitudinally outwardly from the generally vertically disposed abutment surface 8 of the handle 5, so that the abutment surface is adjacent to, spaced inwardly from and facing outwardly toward the boss or projection 7.

The generally U-shaped slidable body or jaw 10 is slidable within an interior hollow of handle 5, and reciprocably shiftable along a direction at an oblique, acute angle with respect to the downwardly facing, engaging surface of fixed jaw 6. The opposite side walls or flanges 11 of U-shaped body or shiftable jaw 10 upstand and have outer end portions 10a shiftable between a retracted non-clamping position within the handle 5 and an extended clamping position beyond the end abutment surface 8 of handle 5 beneath the fixed jaw 6 and on opposite sides of the depending fixed jaw projection or boss 7. The non-clamping position described hereinbefore is shown in FIG. 1, while the clamping position is shown in FIG. 2. The upper or clamping edges of the outer end portions 10a of side walls 11 are cut obliquely with respect to the direction of shifting movement of body 10, and in parallelism with the underside or engaging surface of fixed jaw 6.

Thus, the generally flat rim extensions or flanges 2a, having generally parallel upper and lower surfaces, are each engageable between the upper and lower jaws 6 and 10 of a handle assembly 5. More specifically, the under surface of a fixed jaw 6 is engaged in facing relation with the upper surface of a receptacle flange 2a, with the depending jaw projection 7 conformably engaged downwardly through and beyond the flange opening or hole 3. In addition to this interfitting relation of locating formation, the outermost edge or abutment surface 4 of the flange 2a is engaged in abutment with the end handle abutment surface 8 (see FIG. 2) for positive accurate relative location of flange and handle connecting means. In order to effectively retain the handle connected to the receptacle, the manually actuable member or a button 14 is released for outward shifting movement under the influence of coil compression spring 16 to shift the outer end region 10a of flanges 11 into position beneath the flanged rim 2a. Further, the upper oblique edges of flanges 10a conformably engage with the under surface of the flanged rim 2a, see FIG. 2, to effectively clamp the flanged rim between the jaws 6 and 10. Of course, detachment of the handle 5 from the receptacle is readily effected by manual retraction of the actuation member 14 against the force of spring 16 permitting upward movement of jaw 6 away from the flanged rim 2a to withdraw projection 7 from hole 3.

From the foregoing, it is seen that the present invention provides an household cooking utensil including a receptacle, handle therefore and detachable connection means therebetween, which is uniquely simple in structure, foolproof in operation, safe and durable throughout a long useful life, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A household cooking utensil comprising a receptacle having an outstanding flanged rim extending over at least part of the receptacle circumference, said flanged rim having generally parallel upper and lower surfaces, a handle extending from said flanged rim, and detachable connection means removably connecting said handle to said flanged rim, said connection means comprising a fixed upper jaw fixed relative to said handle and having a bearing surface facing downwardly in removable bearing face to face engagement with the upper rim surface, a movable lower jaw carried by said handle and shiftable longitudinally thereof for movement between a retracted non-clamping position outwardly of the fixed jaw and rim and an extended clamping position beneath said rim and in generally full facing relation with said fixed jaw, said movable jaw having an upwardly facing bearing surface parallel to said fixed jaw bearing surface throughout jaw movement and in upwardly bearing face to face engagement with the underside of said rim in the clamping position, said bearing surfaces of said jaws being oblique to the direction of jaw movement for moving said movable jaw into said clamping engagement in the manner of a wedge, and interfitting formations on said fixed jaw and rim for locating said fixed jaw relative to said rim, said upwardly facing bearing surface of said movable jaw extending beyond said interfitting formations for stable clamping engagement.

2. A household cooking utensil according to claim 1, said interfitting formations comprising an opening on one of said flanged rim and fixed jaw, a projection on the other of said flanged rim and fixed jaw and removably engageable through said opening, a fixed abutment surface on said handle in adjacent facing spaced relation with said projection, and a complementary abutment surface on said flanged rim configured for abutting engagement with said fixed abutment surface when said projection is engaged in said opening to positively locate said flanged rim relative to said handle.

3. A household cooking utensil according to claim 2, said fixed and complementary surfaces being generally rectilinear and normal to a diameter of said receptacle.

4. An household cooking utensil comprising a receptacle having an outstanding flanged rim extending over at least part of the receptacle circumference, said flanged rim having opposite upper and lower surfaces, a handle extending from said flanged rim, and detachable connection means removably connecting said handle to said flanged rim, and said connection means comprising a fixed jaw relative to said handle and removably engageable in facing engagement with one of said rim surfaces, interfitting formations on said fixed jaw and flanged rim for locating said jaw relative to said rim, a movable jaw shiftably mounted relative to said handle and fixed jaw for movement into and out of clamping engagement with the other of said rim surfaces, said locating means comprising an opening one one of said flanged rim and fixed jaw, and a projection on the other of said flanged rim and fixed jaw and removably engageable through said opening, a fixed abutment surface on said handle in adjacent facing spaced relation with said projection, a complementary abutment surface on said flanged rim configured for abutting engagement with said fixed abutment surface when said projection is engaged in said opening to positively locate said flanged rim relative to said handle, said movable jaw comprising a generally U-shaped body including parallel spaced side members on opposite sides of said projection and a connecting web extending across said projection, said U-shaped body being shiftable in a direction oblique to said fixed jaw, and said side members having oblique surfaces movable with said body into and out of parallel facing relation with the engaging face of said fixed jaw for clamping engagement with said flanged rim on the surface opposite to said fixed jaw.

5. An household cooking utensil according to claim 4, in combination with manual actuating means extending from said movable jaw body exteriorly of said handle for finger actuation, and resilient means operatively interconnected between said handle and movable jaw urging the latter into its clamping position toward said fixed jaw.

* * * * *